US012072926B2

(12) United States Patent
Xu et al.

(10) Patent No.: US 12,072,926 B2
(45) Date of Patent: Aug. 27, 2024

(54) IMAGE SEARCH METHOD AND COMPUTING DEVICE

(71) Applicant: SHANGHAI BILIBILI TECHNOLOGY CO., LTD., Shanghai (CN)

(72) Inventors: Quanhui Xu, Shanghai (CN); Cong Liu, Shanghai (CN); Jinchao Liu, Shanghai (CN); Liming Yu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/036,604

(22) PCT Filed: Sep. 23, 2021

(86) PCT No.: PCT/CN2021/119992
§ 371 (c)(1),
(2) Date: May 11, 2023

(87) PCT Pub. No.: WO2022/100290
PCT Pub. Date: May 19, 2022

(65) Prior Publication Data
US 2023/0418862 A1 Dec. 28, 2023

(30) Foreign Application Priority Data
Nov. 13, 2020 (CN) .......................... 202011272332.7

(51) Int. Cl.
*G06F 16/535* (2019.01)
*G06F 16/538* (2019.01)
*G06F 16/587* (2019.01)

(52) U.S. Cl.
CPC .......... *G06F 16/535* (2019.01); *G06F 16/538* (2019.01); *G06F 16/587* (2019.01)

(58) Field of Classification Search
CPC .... G06F 16/535; G06F 16/538; G06F 16/587; G06F 16/434; G06F 16/583
See application file for complete search history.

(56) References Cited

U.S. PATENT DOCUMENTS

2012/0288142 A1* 11/2012 Gossweiler, III .... G06V 40/167
382/118
2017/0308553 A1 10/2017 Xu et al.
(Continued)

FOREIGN PATENT DOCUMENTS

CN 102520858 A 6/2012
CN 103246742 A 8/2013
(Continued)

OTHER PUBLICATIONS

International Patent Application No. PCT/CN2021/119992; Int'l Search Report; dated Dec. 23, 2021; 3 pages.
(Continued)

*Primary Examiner* — Cam Y T Truong
(74) *Attorney, Agent, or Firm* — BakerHostetler

(57) ABSTRACT

This application provides techniques of searching images. The techniques comprise monitoring a moving state of a first computing device; controlling the first computing device to obtain an image comprising a target object to be searched in response to determining that the moving state of the first computing device meets a preset condition; determining a first coordinate group of the target object in the image; acquiring a target image of the target object from the image based on the first coordinate group; determining, based on the target image, a search result related to the target object and displaying the search result.

18 Claims, 6 Drawing Sheets

(56) References Cited

U.S. PATENT DOCUMENTS

2019/0005046 A1\* 1/2019 Arora .................. G06F 16/9537
2019/0244387 A1 8/2019 Zhou et al.

FOREIGN PATENT DOCUMENTS

| CN | 106469308 A | 3/2017 |
| --- | --- | --- |
| CN | 107169148 A | 9/2017 |
| CN | 107436880 A | 12/2017 |
| CN | 108304837 A | 7/2018 |
| CN | 110110110 A | 8/2019 |
| CN | 110458107 A | 11/2019 |
| CN | 110503087 A | 11/2019 |
| CN | 111145153 A | 5/2020 |
| CN | 111178410 A | 5/2020 |
| CN | 111737604 A | 10/2020 |
| CN | 112380372 A | 2/2021 |

OTHER PUBLICATIONS

"Polaroid—Image Search and Recognition"; https://developer.aliyun.com/article/194353?spm=a2c6h.14164896; Aliyun; Sep. 2017; accessed May 11, 2023; 11 pages.

Wayne-Lee; "Exactly the same data interaction method and program access entry under cloud storage"; https://blog.csdn.net/javensblog/article/details/23180069; CSDN; Apr. 2018; accessed May 11, 2023; 2 pages.

Shan Yanmei; "Research on Image Retrieval Method Based on Image Principal Part Detection"; North China University of Technology; Dissertation; May 2018; 60 pages (English Abstract see pp. II and III).

Lan et al.; Basic Theory of Image Processing Technology; Research about Applications of Image Processing Technologies using Artificial Intelligence; Jul. 2020; p. 39-43 (contains English Summary).

Ji Ma; Basic Knowledge of Digital Image Processing; Postal Technology Equipment and Management; Aug. 2018; p. 36-43 (contains English Summary).

\* cited by examiner

IMAGE SEARCH METHOD AND COMPUTING DEVICE

CROSS-REFERENCE TO RELATED APPLICATIONS

This application is the U.S. National Stage of International Application No. PCT/CN2021/119992, filed on Sep. 23, 2021, which claims priority to Chinese Patent Application No. 202011272332.7, filed with the China National Intellectual Property Administration on Nov. 13, 2020, and entitled "IMAGE SEARCH METHOD AND COMPUTING DEVICE", both of which are incorporated herein by reference in their entireties its entirety.

TECHNICAL FIELD

This application relates to the field of image processing technologies, and in particular, to an image search method. One or more embodiments of this application simultaneously relate to a computing device, a computer-readable storage medium, and a computer program product.

BACKGROUND

With the popularity of the Internet, people can search for any required object on the Internet, and can usually enter a name of an object or a feature of an object for search. However, features of some objects are difficult to describe in words, and therefore a user may choose to use an image of an object for search.

In the conventional technology, the user may touch a shooting button displayed by a first computing device, shoot, by using a camera of the first computing device, a to-be-searched image of a target object that needs to be searched for, and upload the to-be-searched image to a server. After receiving the to-be-searched image, the server performs similarity matching between the to-be-searched image and images in an image library, and feeds back, to the first computing device for display, a plurality of images with relatively high similarity with the to-be-searched image and files corresponding to the images as search results.

However, in the foregoing manner, the user needs to touch the shooting button to trigger an operation of obtaining the to-be-searched image, which wastes time and may reduce user experience, thereby reducing image search efficiency. In addition, the to-be-searched image may be relatively large, and the to-be-searched image may include not only the target object, but also another object. Therefore, if a search result is directly determined based on the to-be-searched image, image search accuracy may be reduced.

SUMMARY

In view of this, embodiments of this application provide an image search method. This application simultaneously relates to a computing device, a computer-readable storage medium, and a computer program product, to resolve a technical defect of low image search efficiency and accuracy in the conventional technology.

According to a first aspect of the embodiments of this application, an image search method is provided and includes:

monitoring a moving state of a first computing device, and if it is determined that the moving state of the first computing device meets a preset condition, controlling the first computing device to obtain a to-be-searched image including a target object;

determining a first coordinate group of the target object in the to-be-searched image;

obtaining a target image of the target object from the to-be-searched image based on the first coordinate group; and determining and displaying, based on the target image, a search result related to the target object.

According to a second aspect of the embodiments of this application, a computing device is provided, and the computing device includes:

a first obtaining module, configured to monitor a moving state of a first computing device, and if it is determined that the moving state of the first computing device meets a preset condition, control the first computing device to obtain a to-be-searched image including a target object;

a first determining module, configured to determine a first coordinate group of the target object in the to-be-searched image;

a second obtaining module, configured to obtain a target image of the target object from the to-be-searched image based on the first coordinate group; and a second determining module, configured to determine and display, based on the target image, a search result related to the target object.

According to a third aspect of the embodiments of this application, a computing device is provided and includes:

a memory and a processor, where the memory is configured to store computer executable instructions, and the processor is configured to execute the computer executable instructions to:

monitor a moving state of a first computing device, and if it is determined that the moving state of the first computing device meets a preset condition, control the first computing device to obtain a to-be-searched image including a target object;

determine a first coordinate group of the target object in the to-be-searched image;

obtain a target image of the target object from the to-be-searched image based on the first coordinate group; and determine and display, based on the target image, a search result related to the target object.

According to a fourth aspect of the embodiments of this application, a computer-readable storage medium is provided. The computer-readable storage medium stores computer executable instructions, and the computer executable instructions are executed by a processor to implement the steps of the image search method.

According to a fifth aspect of the embodiments of this application, a computer program product is provided. When the computer program product is executed in a computer, the computer is enabled to perform the steps of the foregoing image search method.

According to the image search method provided in this application, the moving state of the first computing device is monitored, and if it is determined that the moving state of the first computing device meets the preset condition, the first computing device is controlled to obtain the to-be-searched image including the target object; the first coordinate group of the target object in the to-be-searched image is determined; the target image of the target object is obtained from the to-be-searched image based on the first coordinate group; and the search result related to the target object is determined and displayed based on the target image. It is recorded in this application that, when it is considered, based on the moving state of the first computing device, that the user may have an intention to search for the target object, the first computing device may be controlled to obtain the to-be-searched image including the target object, so that a user operation is reduced, to increase a speed of obtaining the to-be-searched image, thereby improving image search efficiency and improving user experience. In addition, in this application, the target object may be cut from the to-be-searched image, to obtain the target image. Because the target image includes only the target object, the search result determined based on the target image may be more accurate, that is, image search accuracy can be improved.

DESCRIPTION OF EMBODIMENTS

Figure 1:
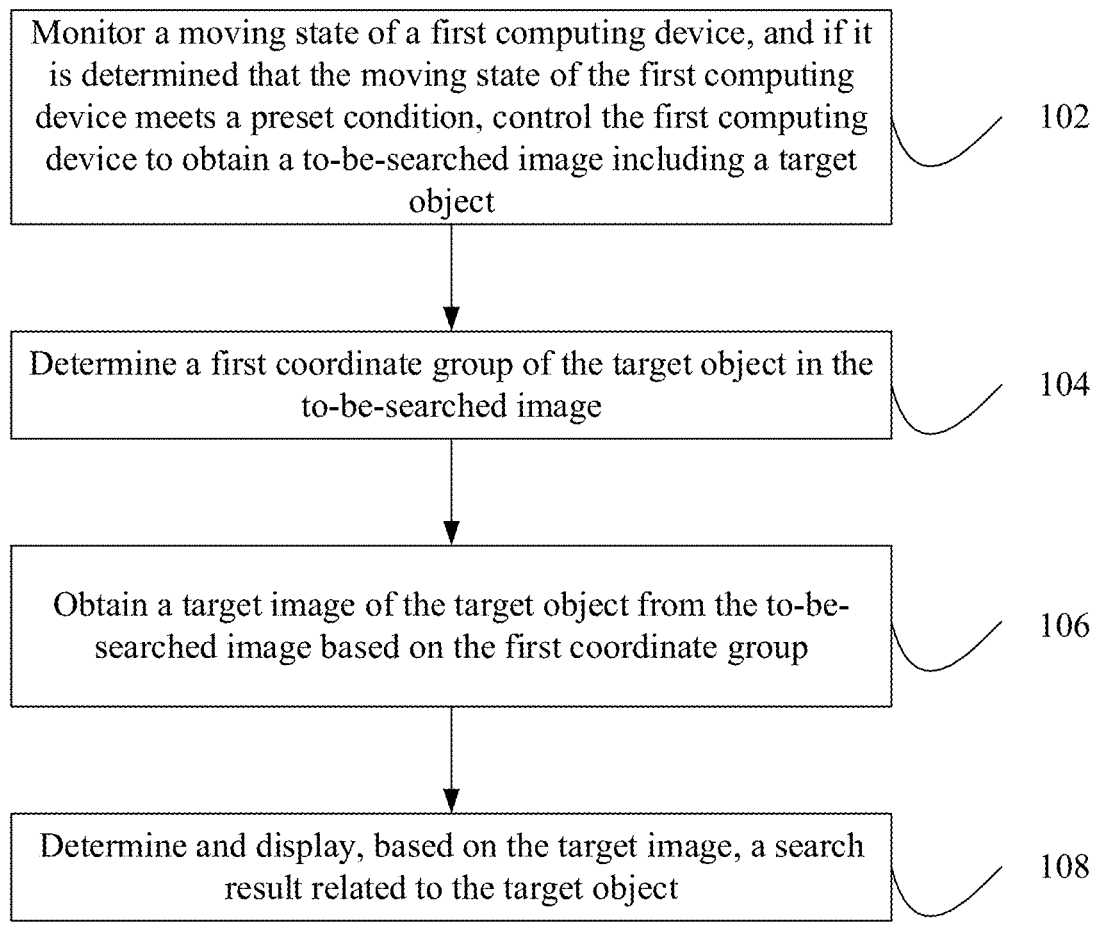
FIG. 1 is a flowchart of an image search method according to an embodiment of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

Target object: An object that a user wants to search for, for example, a garage kit or a poster.

To-be-searched image: An image including an object that the user wants to search for and that is collected by using a camera of an intelligent module. The image may be shot by using the camera when the user presses a shooting button, or may be identified by the camera itself.

Search result: An image and information that are obtained based on an object that the user wants to search for and that are related to the object.

Object detection model: A model obtained through training of a large quantity of images in which a target object exists, which may be considered as a group of model data abstracted through training. The object detection model may be configured to detect whether a target object in a model library exists in an image, and determine a coordinate group of the target object in the image.

The following describes an application scenario of an image search method provided in this application.

According to an image search method in the conventional technology, a first computing device displays a camera preview interface, and the interface displays a shooting button. A user may control a camera of the first computing device to aim at an object that the user wants to search for, and then touch the shooting button, and therefore the first computing device can shoot, by using the camera, a to-be-searched image of a target object that needs to be searched for. In this way, the user needs to perform a related operation to obtain the to-be-searched image, which causes a waste of time. In addition, after obtaining the to-be-searched image, the first computing device sends the to-be-searched image to a server. The server may determine, based on the to-be-searched image, a search result related to the target object, and send the search result to the first computing device for display. In this case, because the shot to-be-searched image may be relatively large, and if the to-be-searched image is directly sent to the server, a case of a relatively slow upload speed or even an upload failure may occur, thereby reducing image search efficiency.

To reduce a user operation and reduce duration of image search to improve image search efficiency, this application provides an image search method. A moving state of a first computing device may be monitored, and if it is determined that the moving state of the first computing device meets a preset condition, it may be considered that a user wants to perform image search, and the first computing device may be controlled to obtain a to-be-searched image including a target object; a location of the target object in the to-be-searched image is determined, and the target object is cut from the to-be-searched image based on the location, to obtain a target image; and a search result related to the target object is determined and displayed based on the target image. Therefore, the to-be-searched image can be obtained without user participation, and the to-be-searched image is cut to reduce a size of an uploaded image and increase an upload speed, thereby improving image search efficiency.

In this application, an image search method is provided, and this application simultaneously relates to a computing device and a computer-readable storage medium. Details are described one by one in the following embodiments.

FIG. 1 is a flowchart of an image search method according to an embodiment of this application. The method specifically includes the following steps.

Step 102: Monitor a moving state of a first computing device, and if it is determined that the moving state of the first computing device meets a preset condition, control the first computing device to obtain a to-be-searched image including a target object.

In this embodiment of this application, the image search method is performed by an intelligent module, and the intelligent module and the first computing device are integrally designed, that is, the intelligent module may be a module in the first computing device; or the intelligent module may be a module in another computing device, and the another computing device and the first computing device may be two different computing devices.

Specifically, the target object is an object that a user wants to search for. The to-be-searched image is an image including the object that the user wants to search for.

In actual application, the first computing device may display a camera preview interface. If a camera permission is available, a camera may be opened to enter an image acquisition page. In this case, the moving state of the first computing device may be monitored by using an acceleration sensor.

In a possible implementation, the moving state includes a moving distance, and a specific implementation of monitoring a moving state of a first computing device may include: periodically detecting a location of the first computing device within a preset duration range; determining a moving distance of the first computing device in each period included in the preset duration range based on a location of the first computing device in the period, and comparing the moving distance with a preset distance threshold; and correspondingly, a specific implementation of determining that the moving state of the first computing device meets a preset condition may include: if the moving distance of the first computing device in each period included in the preset duration range is less than the distance threshold, the moving state of the first computing device meets the preset condition.

It should be noted that both the preset duration range and the distance threshold may be set by the user according to an actual requirement, or may be set by the intelligent module by default. This is not limited in this embodiment of this application.

In actual application, if the user moves the first computing device, the acceleration sensor may sense a movement, and record a location of the first computing device. Specifically, in preset duration, the location of the first computing device may be periodically detected by using the acceleration sensor, and the moving distance of the first computing device in each period may be determined based on locations of the first computing device in two adjacent periods. The moving distance is compared with the preset distance threshold, and if the moving distance of the first computing device in each period within the preset duration range is less than the distance threshold, it indicates that a location change of the first computing device in each period is very small and may be basically ignored. Therefore, it may be considered that the moving state of the first computing device meets the preset condition.

For example, a detection period is 50 milliseconds and the preset duration range is 1 second. It is assumed that the location of the first computing device is determined once every 50 milliseconds by using the acceleration sensor, 21 locations (including an initial location) may be determined within 1 second. A moving distance of the first computing device in each period may be determined based on the 21 locations, to determine 20 moving distances. All the 20 moving distances are compared with the distance threshold, and if the 20 moving distances are all less than the distance threshold, it may be considered that the first computing device is in a relatively static state within the 1 second, and a moving range is extremely small. Therefore, it may be considered that the moving state of the first computing device meets the preset condition.

It is recorded in this application that the location of the first computing device is detected by using the acceleration sensor, and the moving distance of the first computing device is determined. In addition, when it is determined that the moving distance in each period within the preset duration range is sufficiently small, it may be considered that the first computing device is in a relatively static state, and duration is relatively long. Further, it may be considered that the user has an intention to perform image search, to determine a condition of obtaining the to-be-searched image, which does not require a user operation, and can save time.

In some embodiments, the location of the first computing device includes coordinate values in three directions, and a specific implementation of determining a moving distance of the first computing device in each period included in the preset duration range based on a location of the first computing device in the period, and comparing the moving distance with a preset distance threshold may include: determining moving distances of the first computing device in the three directions in each period based on the coordinate values of the first computing device in the three directions in each period included in the preset duration range; and comparing the moving distances of the first computing device in the three directions in each period with the distance threshold; and correspondingly, a specific implementation of determining that the moving state of the first computing device meets a preset condition may include: if the moving distances of the first computing device in the three directions in each period included in the preset duration range are all less than the distance threshold, the moving state of the first computing device meets the preset condition.

In actual application, the location of the first computing device determined by using the acceleration sensor may be coordinate values including three directions. In this case, moving distances of the first computing device in the three directions in each period may be respectively determined based on coordinates of the first computing device in the three directions in two adjacent periods. The moving distances of the first computing device in the three directions in each period are compared with the distance threshold. If the moving distances of the first computing device in the three directions in each period within the preset duration range are all less than the distance threshold, it indicates that a location change of the first computing device in each period is very small and may be basically ignored. Therefore, it may be considered that the moving state of the first computing device meets the preset condition.

For example, a detection period is 50 milliseconds and the preset duration range is 1 second. It is assumed that the location of the first computing device that includes three coordinates is determined once every 50 milliseconds by using the acceleration sensor, and 21 locations (including an initial location) may be determined within 1 second. Moving distances of the first computing device in the three directions in each period may be determined based on the 21 locations, 20 moving distances in each direction are determined, and 60 moving distances may be determined. All the 60 moving distances are compared with the distance threshold, and if the 60 moving distances are all less than the distance threshold, it may be considered that the first computing device is in a relatively static state within the 1 second, and a moving range is extremely small. Therefore, it may be considered that the moving state of the first computing device meets the preset condition.

In this way, compared with a manner of determining a moving distance based on an overall location of the first computing device, a manner of determining moving distances in more refined three directions, and determining, based on the moving distances in the three directions, whether the first computing device is in a relatively static state can more accurately determine a user intention.

Further, the monitoring a moving state of a first computing device may further include: if a moving distance of the first computing device in a first period included in the preset duration range is greater than the distance threshold, re-performing the step of periodically detecting a location of the first computing device within a preset duration range.

Specifically, the first period may be any period within the preset duration range.

In actual application, when the moving state is a moving distance, after the moving distance of the first computing device in each period is compared with the distance threshold, if it is determined that the moving distance in the first period is greater than the distance threshold, it may be considered that a location of the first computing device in the first period changes greatly, the user may substantially move a phone, and it may be considered that the user may have no intention to perform image search. Therefore, the user may return to restart to periodically detect the location of the first computing device within the preset duration range by using the acceleration sensor. In addition, an end time point of the first period may be used as a start time point of a next preset duration range.

For example, a detection period is 50 milliseconds and the preset duration range is 1 second. It is assumed that the location of the first computing device is determined once every 50 milliseconds by using the acceleration sensor, and 21 locations (including an initial location) may be determined within 1 second. A moving distance of the first computing device in each period may be determined based on the 21 locations, to determine 20 moving distances. All the 20 moving distances are compared with the distance threshold, and if a moving distance in a tenth period in the 20 moving distances is greater than the distance threshold, it may be considered that a moving range of the first computing device in the tenth period is relatively large. Therefore, it may be considered that the user has no intention to perform image search. An end time point of the tenth period may be determined as a start time point of a next preset duration range, to re-detect the location of the first computing device and perform subsequent steps.

It is recorded in this application that, if a moving distance of the first computing device in a period within the preset duration range is relatively long, it may be considered that the user may not want to perform image search, and the moving state may be re-detected in a next round. In this way, the moving state of the first computing device is continuously detected, and provided that there is a moving distance that is within the preset duration range and that is greater than the distance threshold, start time of the preset duration range is re-recorded, to more accurately determine the user intention.

Further, the monitoring a moving state of a first computing device may further include: if a moving distance of the first computing device in a first direction in a first period included in the preset duration range is greater than the distance threshold, re-performing the step of periodically detecting a location of the first computing device within a preset duration range.

The first direction may be any one of the three directions.

In actual application, when the moving state is a moving distance, after the moving distances of the first computing device in the three directions in each period are compared with the distance threshold, if it is determined that a moving distance in the first direction in the first period is greater than the distance threshold, it may be considered that a location of the first computing device in the first period changes greatly, the user may substantially move the phone, and it may be considered that the user may have no intention to perform image search. Therefore, the user may return to restart to periodically detect the location of the first computing device within the preset duration range by using the acceleration sensor. In addition, an end time point of the first period may be used as a start time point of a next preset duration range.

For example, a detection period is 50 milliseconds and the preset duration range is 1 second. It is assumed that a location of the first computing device that includes three coordinates is determined once every 50 milliseconds by using the acceleration sensor, and 21 locations (including an initial location) may be determined within 1 second. Moving distances of the first computing device in three directions in each period may be determined based on the 21 locations, 20 moving distances in each direction are determined, and 60 moving distances may be determined. All the 60 moving distances are compared with the distance threshold, and if a moving distance in an x-axis direction in a tenth period in the 60 moving distances is greater than the distance threshold, it may be considered that a moving range of the first computing device in the tenth period is relatively large. Therefore, it may be considered that the user has no intention to perform image search. An end time point of the tenth period may be determined as a start time point of a next preset duration range, to re-detect the location of the first computing device periodically and perform subsequent steps.

In this way, compared with a manner of determining a moving distance based on an overall location of the first computing device, moving distances in more refined three directions are determined, and if there is a moving distance that is greater than the distance threshold and that is in the three directions, it may be considered that the user may not want to perform image search, and the moving state may be re-detected in a next round. In this way, the moving state of the first computing device is continuously detected, and provided that there is a moving distance that is in a direction within the preset duration range and that is greater than the distance threshold, start time of the preset duration range is re-recorded, to more accurately determine the user intention.

In another possible implementation, the moving state includes a moving speed, and a specific implementation of monitoring a moving state of a first computing device may include: periodically detecting a location of the first computing device within a preset duration range; determining a moving distance of the first computing device in each period included in the preset duration range based on a location of the first computing device in the period; determining a moving speed of the first computing device in each period based on a period length of the period and the moving distance of the first computing device in the period; and comparing the moving speed with a preset speed threshold; and correspondingly, a specific implementation of determining that the moving state of the first computing device meets a preset condition may include: if the moving speed of the first computing device in each period included in the preset duration range is less than the speed threshold, the moving state of the first computing device meets the preset condition.

It should be noted that the speed threshold may be set by the user according to an actual requirement, or may be set by the intelligent module by default. This is not limited in this embodiment of this application.

In actual application, if the user moves the first computing device, the acceleration sensor may sense a movement, and record a location of the first computing device. Specifically, in preset duration, the location of the first computing device may be periodically detected by using the acceleration sensor, and the moving distance of the first computing device in each period may be determined based on locations of the first computing device in two adjacent periods, and the moving speed of the first computing device in each period may be determined based on a period length of the period. The moving speed is compared with the preset speed threshold, and if the moving speed of the first computing device in each period within the preset duration range is less than the speed threshold, it indicates that a location change of the first computing device in each period is very small and may be basically ignored. Therefore, it may be considered that the moving state of the first computing device meets the preset condition.

For example, a detection period is 50 milliseconds and the preset duration range is 1 second. It is assumed that the location of the first computing device is determined once every 50 milliseconds by using the acceleration sensor, and 21 locations (including an initial location) may be determined within 1 second. A moving distance of the first computing device in each period may be determined based on the 21 locations, to determine 20 moving distances, and a moving speed of the first computing device in each period may be determined based on a period length of the period. All the 20 moving speeds are compared with the speed threshold, and if the 20 moving speeds are all less than the speed threshold, it may be considered that the first computing device is in a relatively static state within the 1 second, and a moving range is extremely small. Therefore, it may be considered that the moving state of the first computing device meets the preset condition.

It is recorded in this application that the location of the first computing device is detected by using the acceleration sensor, and the moving distance of the first computing device is determined. Further, the moving speed is determined based on the period length, and when it is determined that a moving speed in each period within the preset duration range is sufficiently small, it may be considered that the first computing device is in a relatively static state, and duration is relatively long. Further, it may be considered that the user has an intention to perform image search, to determine a condition of obtaining the to-be-searched image, which does not require a user operation, and can save time.

Further, the monitoring a moving state of a first computing device may further include: if a moving speed of the first computing device in a first period included in the preset duration range is greater than the speed threshold, re-performing the step of periodically detecting a location of the first computing device within a preset duration range.

In actual application, when the moving state is a moving speed, after the moving speed of the first computing device in each period is compared with the speed threshold, if it is determined that the moving speed in the first period is greater than the speed threshold, it may be considered that a location of the first computing device in the first period changes greatly, the user may substantially move the phone, and it may be considered that the user may have no intention to perform image search. Therefore, the user may return to restart to periodically detect the location of the first computing device within the preset duration range by using the acceleration sensor. In addition, an end time point of the first period may be used as a start time point of a next preset duration range.

For example, a detection period is 50 milliseconds and the preset duration range is 1 second. It is assumed that the location of the first computing device is determined once every 50 milliseconds by using the acceleration sensor, and 21 locations (including an initial location) may be determined within 1 second. A moving distance of the first computing device in each period may be determined based on the 21 locations, to determine 20 moving distances, and a moving speed of the first computing device in each period is determined based on the period length, to obtain 20 moving speeds. All the 20 moving speeds are compared with the speed threshold, and if a moving speed in a tenth period in the 20 moving speeds is greater than the speed threshold, it may be considered that a moving range of the first computing device in the tenth period is relatively large. Therefore, it may be considered that the user has no intention to perform image search. An end time point of the tenth period may be determined as a start time point of a next preset duration range, to re-detect the location of the first computing device periodically and perform subsequent steps.

It is recorded in this application that if a moving speed of the first computing device in a period within the preset duration range is relatively high, it may be considered that the user may not want to perform image search, and a moving state may be re-detected in a next round. In this way, the moving state of the first computing device is continuously detected, and provided that there is a moving speed that is within the preset duration range and that is greater than the speed threshold, start time of the preset duration range is re-recorded, and the location of the first computing device is re-detected, to more accurately determine the user intention.

In actual application, when the first computing device is controlled to obtain the to-be-searched image including the target object, the first computing device may identify the target object by using a camera and obtain the to-be-searched image of the target object, so that the user does not need to manually touch a shooting button, to reduce a user operation and save time.

In this application, the moving distance or the moving speed of the first computing device may be monitored, and only when it is determined that the moving speed in each period or the moving distance in each period within the preset duration range is sufficiently small, it is considered that the first computing device may be in a relatively static state, and that the user may have an intention to perform image search. In addition, the first computing device is controlled to collect the to-be-searched image, so that the user intention can be more accurately determined, and image acquisition can be performed without a user operation, to save time and improve image acquisition efficiency.

Step 104: Determine a first coordinate group of the target object in the to-be-searched image.

In a possible implementation, a specific implementation of determining a first coordinate group of the target object in the to-be-searched image may include: inputting the to-besearched image into an object detection model, and outputting the first coordinate group of the target object in the to-be-searched image.

The object detection model may be configured to detect whether a target object in a model library exists in an image, and determine a coordinate group of the target object in the image.

For example, the first coordinate group may include four coordinate points, that is, the first coordinate group may form a square box.

In an example, the object detection model may be pre-trained by using a large quantity of images. Specifically, a sample image may be used as a sample, and an actual coordinate group of the target object in the sample image may be used as a sample label and input into the object detection model. The object detection model may output a predictive coordinate group based on a model initial parameter, and determine a loss value based on the predictive coordinate group and the actual coordinate group. If the loss value is greater than a loss threshold, it indicates that the model has not been successfully trained, and the object detection model continues to be iteratively trained based on the loss value until the loss value is less than the loss threshold or a quantity of training times is greater than a quantity threshold. Therefore, it may be considered that the model has finished the training, and the current object detection model is determined as a trained object detection model.

In actual application, after the to-be-searched image is input into the object detection model, the object detection model may identify the target object in the to-be-searched image, and output the first coordinate group of the target object in the to-be-searched image.

Figure 2:
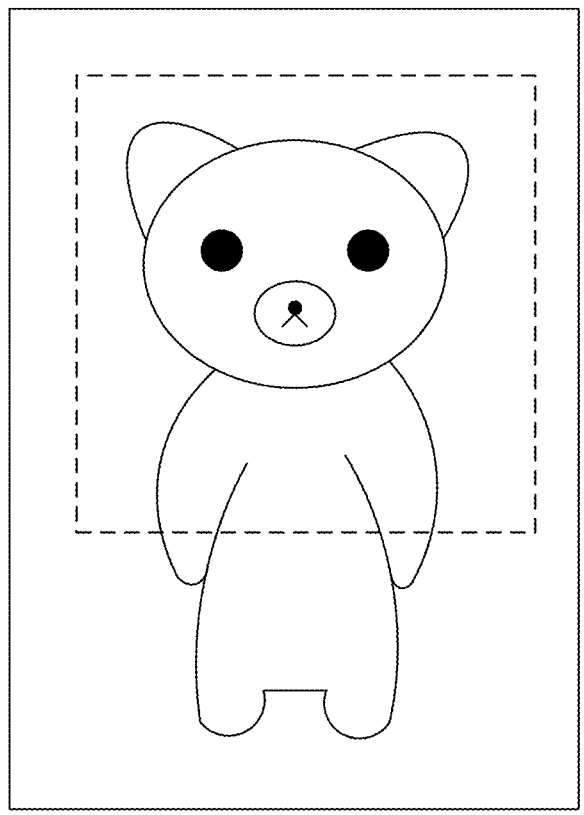
FIG. 2 is a schematic diagram of a to-be-searched image according to an embodiment of this application.

For example, as shown in FIG. 2, a dashed line box in FIG. 2 is a box formed by the first coordinate group, and coordinates of four corners of the dashed line box are four coordinates included in the first coordinate group.

In this application, a location of the target object in the to-be-searched image may be directly determined by using the object detection model, to quickly and accurately determine the target object in the to-be-searched image.

Further, before the determining a first coordinate group of the target object in the to-be-searched image, the to-be-searched image may be alternatively compressed based on a preset ratio, to obtain a compressed image.

Correspondingly, in another possible implementation, a specific implementation of determining a first coordinate group of the target object in the to-be-searched image may include: inputting the compressed image into the object detection model, and outputting a second coordinate group of the target object in the compressed image; and converting the second coordinate group into the first coordinate group based on the preset ratio.

It should be noted that the preset ratio may be set by the user according to an actual requirement, or may be set by the intelligent module by default. This is not limited in this embodiment of this application.

In actual application, the to-be-searched image may occupy relatively large storage space, that is, the to-be-searched image may be relatively large. To reduce traffic consumption and reduce a computing amount of the object detection model, the to-be-searched image may be compressed based on the preset ratio, and the compressed image may be input into the object detection model, to determine a coordinate group of the target object in the compressed image, and then the coordinate group is converted to obtain the first coordinate group of the target object in the to-be-searched image.

For example, assuming that a length of the to-be-searched image is 20 cm, a width thereof is 10 cm, and the preset ratio is 2:1, the length of the to-be-searched image may be compressed to 10 cm, and the width thereof may be compressed to 5 cm, to obtain a compressed image with a length of 10 cm and a width of 5 cm. The compressed image is input into the object detection model, to output a second coordinate group of the target object in the compressed image. It is assumed that an upper left corner of the compressed image is used as an origin, a length direction is used as an x-axis, and a width direction is used as a y-axis, and it may be determined that the second coordinate group includes four coordinates: (2.5, 1), (7.5, 1), (2.5, 4), and (7.5, 4). Further, the first coordinate group of the target object in the to-be-searched image may be determined as (5, 2), (15, 2), (5, 8), and (15, 8) based on the preset ratio.

In this application, the to-be-searched image may be compressed to determine coordinates of the target object in the compressed image, and then determine coordinates of the target object in the to-be-searched image, so that traffic consumption can be reduced, and a computing amount of the object detection model can be reduced, to improve efficiency of determining the first coordinate group.

Step 106: Obtain a target image of the target object from the to-be-searched image based on the first coordinate group.

Because the to-be-searched image may be relatively large, and the to-be-searched image may include a plurality of objects, to reduce traffic consumption and improve image search accuracy, the target object may be cut from the to-be-searched image.

In a possible implementation, a specific implementation of obtaining a target image of the target object from the to-be-searched image based on the first coordinate group may include: cutting an image that is included in the first coordinate group and that is in the to-be-searched image, to obtain the target image of the target object.

In actual application, an image in the box formed by the first coordinate group may be cut from the to-be-searched image, to obtain the target image including only the target object. For example, as shown in FIG. 2, an image in the dashed line box in FIG. 2 is the target image of the target object. For example, the target object may be a product that the user wants to search for, and therefore the target image may also be referred to as a product image.

In this way, a size of an uploaded image is reduced, to reduce traffic consumption, and an image search difficulty is reduced, to improve image search accuracy.

In another possible implementation, a specific implementation of obtaining a target image of the target object from the to-be-searched image based on the first coordinate group may include: compressing the to-be-searched image based on a preset ratio, to obtain a compressed image; determining a second coordinate group of the target object in the compressed image based on the preset ratio and the first coordinate group; and cutting an image that is included in the second coordinate group and that is in the compressed image, to obtain the target image of the target object.

It should be noted that, in the foregoing implementation, the first coordinate group is obtained by directly inputting the to-be-searched image into the object detection model without compressing the to-be-searched image.

In actual application, because the to-be-searched image may be relatively large, the to-be-searched image may be compressed, and the first coordinate group is converted based on the preset ratio, to obtain the second coordinate group of the target object in the compressed image. An image in the box formed by the second coordinate group is cut from the compressed image, to obtain the target image including only the target object.

In this application, the to-be-searched image may be compressed and the target image is cut from the compressed image, so that a size of an uploaded image can be further reduced, and an image search difficulty can be reduced.

Further, before the obtaining a target image of the target object from the to-be-searched image based on the first coordinate group, a target probability that a target object included in a model library exists in the to-be-searched image may be alternatively determined based on the object detection model.

Correspondingly, a specific implementation of obtaining a target image of the target object from the to-be-searched image based on the first coordinate group may include: if the target probability is greater than a probability threshold, obtaining the target image of the target object from the to-be-searched image based on the first coordinate group.

Specifically, the target probability is probability that the target object is an object in the model library. Alternatively, the target probability may be understood as similarity between the target object and an object in the model library.

In an example, the object detection model may be pre-trained by using a large quantity of images. Specifically, a sample image may be used as a sample, and an actual coordinate group of the target object in the sample image and the target probability of the target object may be used as sample labels and input into the object detection model. The object detection model may output a predictive coordinate group and a predictive probability based on a model initial parameter, and determine a loss value based on the predictive coordinate group, the actual coordinate group, the predictive probability, and an actual probability. If the loss value is greater than a loss threshold, it indicates that the model has not been successfully trained, and the object detection model continues to be iteratively trained based on the loss value until the loss value is less than the loss threshold or a quantity of training times is greater than a quantity threshold. Therefore, it may be considered that the model has finished the training, and the current object detection model is determined as a trained object detection model.

In actual application, the to-be-searched image may be input into the object detection model to perform subject detection. If an output target probability is greater than the probability threshold, it may be considered that the to-be-searched image is a valid image, and the target image may be obtained from the to-be-searched image based on the first coordinate group.

In this application, before the target image is obtained, subject detection may be performed on the to-be-searched image, to determine whether the to-be-searched image is a valid image. In this way, an obtained invalid image can be identified, and then a large quantity of invalid images can be filtered out, to improve image search accuracy.

Step 108: Determine and display, based on the target image, a search result related to the target object.

Specifically, the search result may include an image, information related to the image, and the like.

In a possible implementation, a specific implementation of determining, based on the target image, a search result related to the target object may include: sending the target image to a second computing device for storage, and receiving an image address of the target image fed back by the second computing device; and sending the image address to a third computing device, and receiving the search result that is fed back by the third computing device based on the image address and that is related to the target object.

In an example, the second computing device may be considered as a server used for cloud storage of an image, and may further generate an image address of the image. The third computing device may be a service-related server, and may perform image comparison and determine a search result. The image address may be a uniform resource locator (URL) address.

In actual application, the target image may be sent to the second computing device, and the second computing device may store the target image, generate an image address of the target object based on a preset rule, and send the image address to the intelligent module. The intelligent module may send the image address to the third computing device. The third computing device may obtain the target image based on the image address, and perform similarity matching between the obtained target image and images in an image library. The third computing device determines an image whose similarity is greater than a similarity threshold as a matched image, obtains related information of the matched image, and feeds back both the matched image and the related information as search results to the intelligent module for display.

It should be noted that the similarity threshold may be set by the user according to an actual requirement, or may be set by a device by default. This is not limited in this embodiment of this application.

In an example, the second computing device may generate, based on an agreed path, a storage timestamp element, and a specific random character, an image address that can be accessed by an external network.

In an example, the related information of the matched image may be product details, a price, a purchase link, and the like of a product corresponding to the matched image.

In this application, the target image is sent to the second computing device for storage, and the image address is generated. The third computing device only needs to obtain the target image based on the image address, performs similarity matching to obtain the search result, and does not need to store the target object, which can reduce storage pressure of the third computing device.

In another possible implementation, a specific implementation of determining, based on the target image, a search result related to the target object may include: sending the target image to a third computing device, and receiving the search result that is fed back by the third computing device based on the target image and that is related to the target object.

In actual application, the target image may be sent to the third computing device, and the third computing device may store the target image, and perform similarity matching between the target image and images in an image library. The third computing device determines an image whose similarity is greater than a similarity threshold as a matched image, obtains related information of the matched image, and feeds back both the matched image and the related information as search results to the intelligent module for display.

In an example, the related information of the matched image may be product details, a price, a purchase link, and the like of a product corresponding to the matched image.

Figure 3:
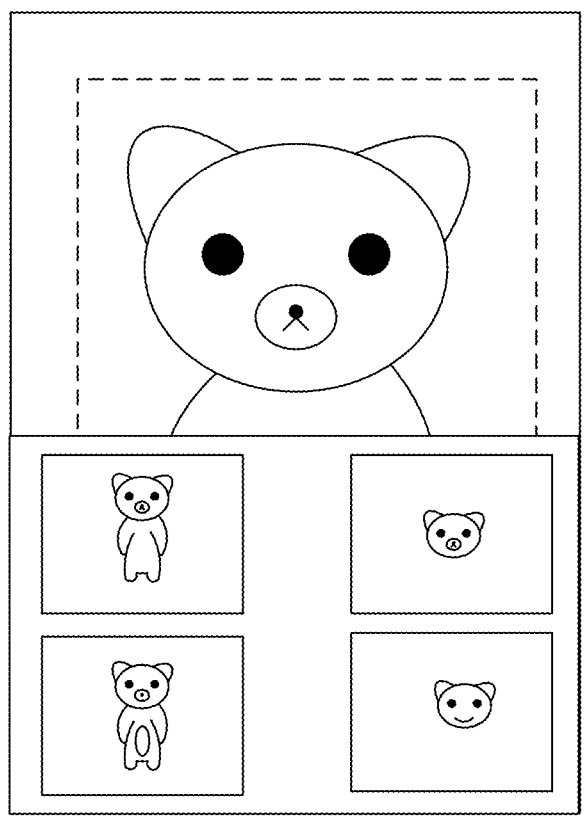
FIG. 3 is a schematic diagram of displaying a search result according to an embodiment of this application.

For example, FIG. 3 shows four search results.

In this application, the target image is sent to the third computing device, and the third computing device performs similarity matching between the target image and the images in the image library to obtain a search result, so that an additional second computing device is not required, to reduce interaction times between computing devices, thereby improving image search efficiency.

Further, after the determining and displaying, based on the target image, a search result related to the target object, the method may further include: receiving an adjustment operation of a user for a vertex location in the first coordinate group; re-obtaining a target image of the target object in response to the adjustment operation; and determining and displaying, based on the re-obtained target image, the search result related to the target object.

In actual application, after the search result is displayed, if the user is not satisfied with the search result, and considers that the determined target image of the target object is inaccurate, the user may manually adjust a vertex in the first coordinate group, re-cut the target object based on the adjusted first coordinate group to obtain the target image, and determine and display the search result based on the re-obtained target image.

Figure 4:
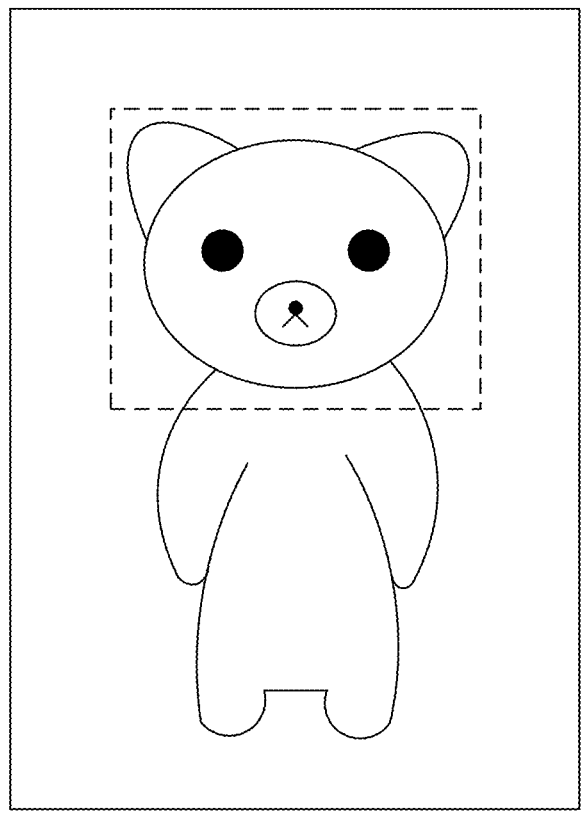
FIG. 4 is a schematic diagram of another to-be-searched image according to an embodiment of this application.
Figure 5:
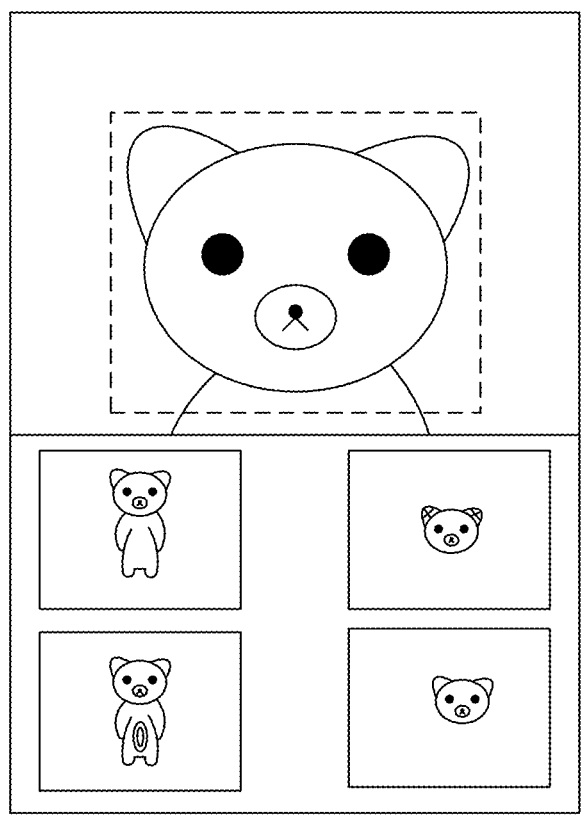
FIG. 5 is a schematic diagram of displaying another search result according to an embodiment of this application.

For example, the user may manually adjust a size of the box formed by the first coordinate group. As shown in FIG. 4, a dashed line box in FIG. 4 is a box formed by the adjusted first coordinate group, and an image in the dashed line box is the re-obtained target image. As shown in FIG. 5, a lower part in FIG. 5 shows four search results re-determined based on the re-obtained target image.

It should be noted that a specific implementation of determining the search results based on the re-obtained target image is similar to the implementation of determining, based on the target image, the search result related to the target object. For details, refer to related descriptions in the foregoing embodiment. Details are not described again in this embodiment.

According to the image search method provided in this application, the moving state of the first computing device is monitored, and if it is determined that the moving state of the first computing device meets the preset condition, the first computing device is controlled to obtain the to-be-searched image including the target object; the first coordinate group of the target object in the to-be-searched image is determined; the target image of the target object is obtained from the to-be-searched image based on the first coordinate group; and the search result related to the target object is determined and displayed based on the target image. It is recorded in this application that, when it is considered, based on the moving state of the first computing device, that the user may have an intention to search for the target object, the first computing device may be controlled to obtain the to-be-searched image including the target object, so that a user operation is reduced, to increase a speed of obtaining the to-be-searched image, thereby improving image search efficiency and improving user experience. In addition, in this application, the target object may be cut from the to-be-searched image, to obtain the target image. Because the target image includes only the target object, the search result determined based on the target image may be more accurate, that is, image search accuracy can be improved.

Figure 6:
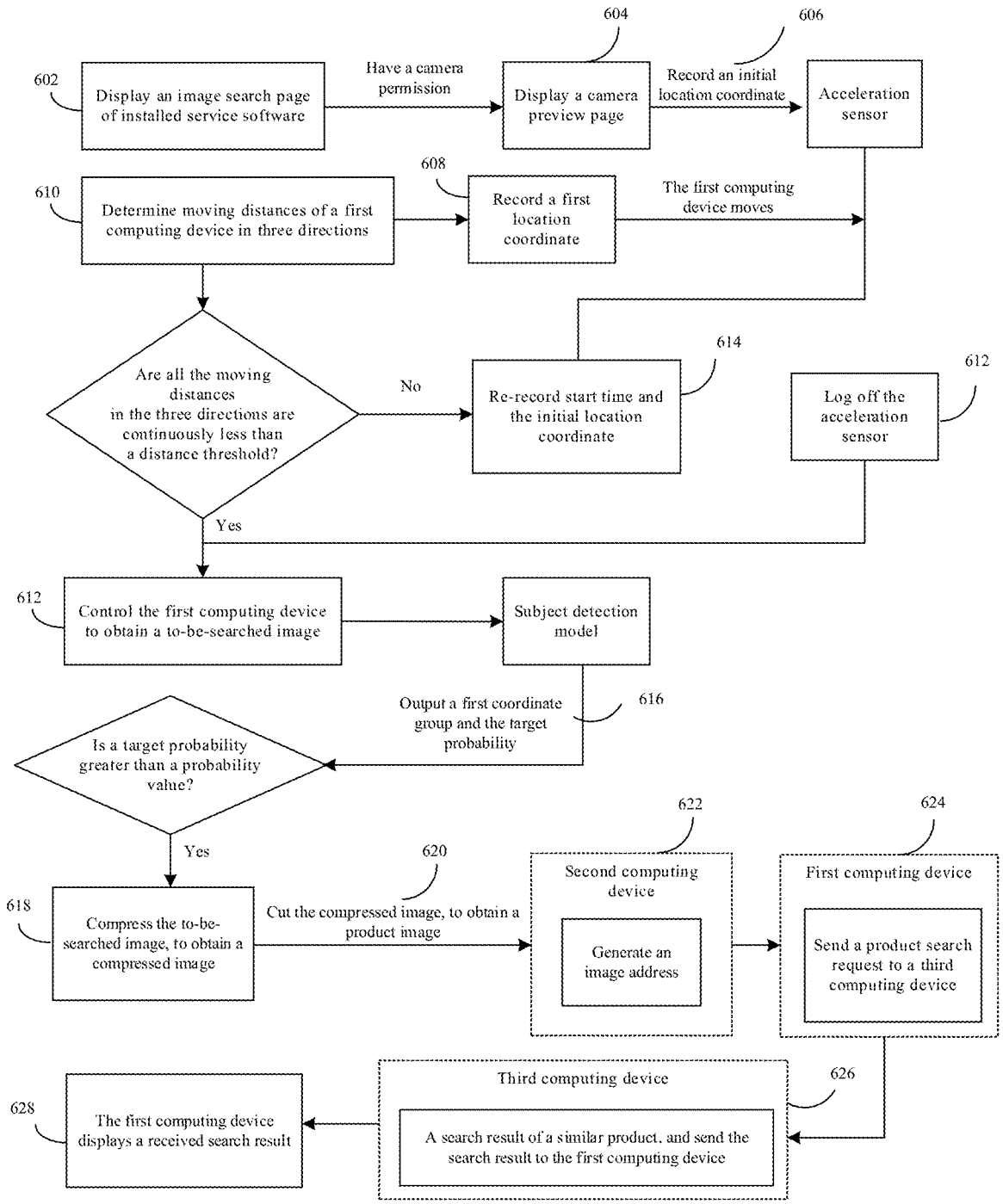
FIG. 6 is a processing flowchart of an image search method applied to similar product search according to an embodiment of this application.

With reference to FIG. 6, the following further describes the image search method by using an example in which the image search method provided in this application is applied to similar product search. FIG. 6 is a processing flowchart of an image search method applied to similar product search according to an embodiment of this application. The method is applied to an intelligent module of a first computing device and specifically includes the following steps:

Step 602: Control the first computing device to display an image search page of installed service software.

In an implementation, a product may be searched by using the service software installed in the first computing device. The service software may be configured with an image search function.

Step 604: If the service software has a camera permission, display a camera preview interface.

Step 606: Monitor a location of the first computing device by using an acceleration sensor, and record an initial location coordinate of the first computing device.

Step 608: If the first computing device moves, the acceleration sensor obtains a first location coordinate after the first computing device moves.

Step 610: Determine moving distances of the first computing device in three directions based on the initial location coordinate and the first location coordinate.

Step 612: If the moving distances in the three directions are all less than a distance threshold, continue monitoring until the moving distances in the three directions within a preset duration range are continuously less than the distance threshold, control the first computing device to obtain a to-be-searched image, and log off the acceleration sensor.

Step 614: If at least one of the three moving distances is greater than the distance threshold, re-record start time of the preset duration range, re-determine a current location coordinate as an initial location coordinate, and return to perform step 608-step 610 until the moving distances in the three directions within the preset duration range are continuously less than the distance threshold.

Step 616: Send the to-be-searched image to a detector, and the detector determines, by using a object detection model, a first coordinate group and a target probability of a product in the to-be-searched image.

Step 618: If the target probability is greater than a probability threshold, compress the to-be-searched image to obtain a compressed image.

Step 620: Cut the location of the product from the compressed image based on the first coordinate group, to obtain a product image, and send the product image to a second computing device.

In an example, the second computing device may be a static resource server.

Step 622: The second computing device generates an image address of the product image, and sends the image address to the first computing device.

The first computing device may be a client computing device.

Step 624: The first computing device sends a product search request to a third computing device, where the product search request may include the image address.

The third computing device may be a service server that provides background service for the service software.

Step 626: The third computing device obtains the product image based on the image address, obtains a search result of a similar product based on the product image, and sends the search result to the first computing device.

Step 628: The first computing device displays the received search result.

According to the image search method provided in this application, the moving state of the first computing device is monitored, and if it is determined that the moving state of the first computing device meets the preset condition, the first computing device is controlled to obtain the to-be-searched image including the target object; the first coordinate group of the target object in the to-be-searched image is determined; the target image of the target object is obtained from the to-be-searched image based on the first coordinate group; and the search result related to the target object is determined and displayed based on the target image. It is recorded in this application that, when it is considered, based on the moving state of the first computing device, that the user may have an intention to search for the target object, the first computing device may be controlled to obtain the to-be-searched image including the target object, so that a user operation is reduced, to increase a speed of obtaining the to-be-searched image, thereby improving image search efficiency and improving user experience. In addition, in this application, the target object may be cut from the to-be-searched image, to obtain the target image. Because the target image includes only the target object, the search result determined based on the target image may be more accurate, that is, image search accuracy can be improved.

Figure 7:
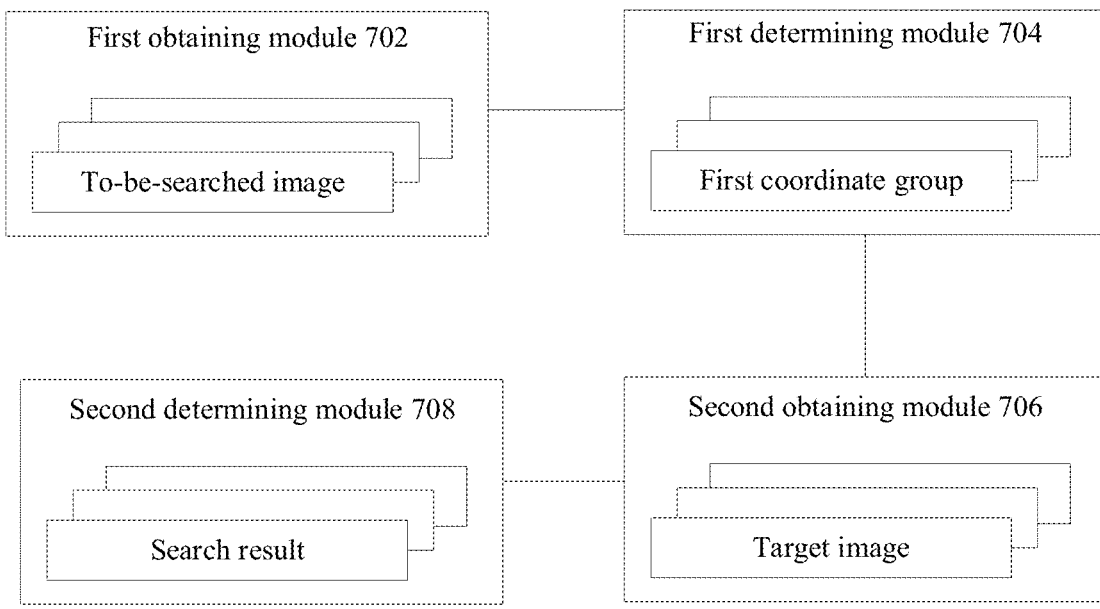
FIG. 7 is a schematic diagram of a structure of a computing device according to an embodiment of this application.

This application further provides a computing device embodiment corresponding to the foregoing method embodiments. FIG. 7 is a schematic diagram of a structure of a computing device according to an embodiment of this application. As shown in FIG. 7, the computing device includes:
- a first obtaining module 702, configured to monitor a moving state of a first computing device, and if it is determined that the moving state of the first computing device meets a preset condition, control the first computing device to obtain a to-be-searched image including a target object;
- a first determining module 704, configured to determine a first coordinate group of the target object in the to-be-searched image;
- a second obtaining module 706, configured to obtain a target image of the target object from the to-be-searched image based on the first coordinate group; and
- a second determining module 708, configured to determine and display, based on the target image, a search result related to the target object.

Optionally, the first obtaining module 702 is configured to:
- periodically detect a location of the first computing device within a preset duration range;
- determine a moving distance of the first computing device in each period included in the preset duration range based on a location of the first computing device in the period, and compare the moving distance with a preset distance threshold; and
- if the moving distance of the first computing device in each period included in the preset duration range is less than the distance threshold, meet, by the moving state of the first computing device, the preset condition.

Optionally, the first obtaining module 702 is further configured to:
- if a moving distance of the first computing device in a first period included in the preset duration range is greater than the distance threshold, re-perform the step of periodically detecting a location of the first computing device within a preset duration range.

Optionally, the first obtaining module 702 is configured to:
- when the location of the first computing device includes coordinate values in three directions, determine moving distances of the first computing device in the three directions in each period based on the coordinate values of the first computing device in the three directions in each period included in the preset duration range;
- compare the moving distances of the first computing device in the three directions in each period with the distance threshold; and
- if the moving distances of the first computing device in the three directions in each period included in the preset duration range are all less than the distance threshold, meet, by the moving state of the first computing device, the preset condition.

Optionally, the first obtaining module 702 is further configured to:
- if a moving distance of the first computing device in a first direction in a first period included in the preset duration range is greater than the distance threshold, re-perform the step of periodically detecting a location of the first computing device within a preset duration range, where the first direction is any one of the three directions.

Optionally, the first obtaining module 702 is configured to:
- periodically detect a location of the first computing device within a preset duration range;
- determine a moving distance of the first computing device in each period included in the preset duration range based on a location of the first computing device in the period;
- determine a moving speed of the first computing device in each period based on a period length of the period and the moving distance of the first computing device in the period;
- compare the moving speed with a preset speed threshold; and
- if the moving speed of the first computing device in each period included in the preset duration range is less than the speed threshold, meet, by the moving state of the first computing device, the preset condition.

Optionally, the first obtaining module 702 is further configured to:
- if a moving speed of the first computing device in a first period included in the preset duration range is greater than the speed threshold, re-perform the step of periodically detecting a location of the first computing device within a preset duration range.

Optionally, the first determining module 704 is configured to:
- input the to-be-searched image into an object detection model, and output the first coordinate group of the target object in the to-be-searched image.

Optionally, the first determining module 704 is further configured to:
- compress the to-be-searched image based on a preset ratio, to obtain a compressed image;
- input the compressed image into an object detection model, and output a second coordinate group of the target object in the compressed image; and
- convert the second coordinate group into the first coordinate group based on the preset ratio.

Optionally, the second obtaining module 706 is configured to:
- cut an image that is included in the first coordinate group and that is in the to-be-searched image, to obtain the target image of the target object.

Optionally, the second obtaining module 706 is configured to:
 compress the to-be-searched image based on a preset ratio, to obtain a compressed image;
 determine a second coordinate group of the target object in the compressed image based on the preset ratio and the first coordinate group; and
 cut an image that is included in the second coordinate group and that is in the compressed image, to obtain the target image of the target object.

Optionally, the second obtaining module 706 is further configured to:
 determine, based on the object detection model, a target probability that a target object included in a model library exists in the to-be-searched image; and
 if the target probability is greater than a probability threshold, obtain the target image of the target object from the to-be-searched image based on the first coordinate group.

Optionally, the second determining module 708 is configured to:
 send the target image to a second computing device for storage, and receive an image address of the target image fed back by the second computing device; and
 send the image address to a third computing device, and receive the search result that is fed back by the third computing device based on the image address and that is related to the target object.

Optionally, the second determining module 708 is configured to:
 send the target image to a third computing device, and receive the search result that is fed back by the third computing device based on the target image and that is related to the target object.

Optionally, the second determining module 708 is further configured to:
 receive an adjustment operation of a user for a vertex location in the first coordinate group;
 re-obtain a target image of the target object in response to the adjustment operation; and
 determine and display, based on the re-obtained target image, the search result related to the target object.

According to the image search method provided in this application, the moving state of the first computing device is monitored, and if it is determined that the moving state of the first computing device meets the preset condition, the first computing device is controlled to obtain the to-be-searched image including the target object; the first coordinate group of the target object in the to-be-searched image is determined; the target image of the target object is obtained from the to-be-searched image based on the first coordinate group; and the search result related to the target object is determined and displayed based on the target image. It is recorded in this application that, when it is considered, based on the moving state of the first computing device, that the user may have an intention to search for the target object, the first computing device may be controlled to obtain the to-be-searched image including the target object, so that a user operation is reduced, to increase a speed of obtaining the to-be-searched image, thereby improving image search efficiency and improving user experience. In addition, in this application, the target object may be cut from the to-be-searched image, to obtain the target image. Because the target image includes only the target object, the search result determined based on the target image may be more accurate, that is, image search accuracy can be improved.

The foregoing describes the schematic solution of the computing device in this embodiment. It should be noted that the technical solution of the computing device and the technical solution of the foregoing image search method belong to a same concept. For details not described in detail in the technical solution of the computing device, refer to the descriptions of the technical solution of the foregoing image search method.

Figure 8:
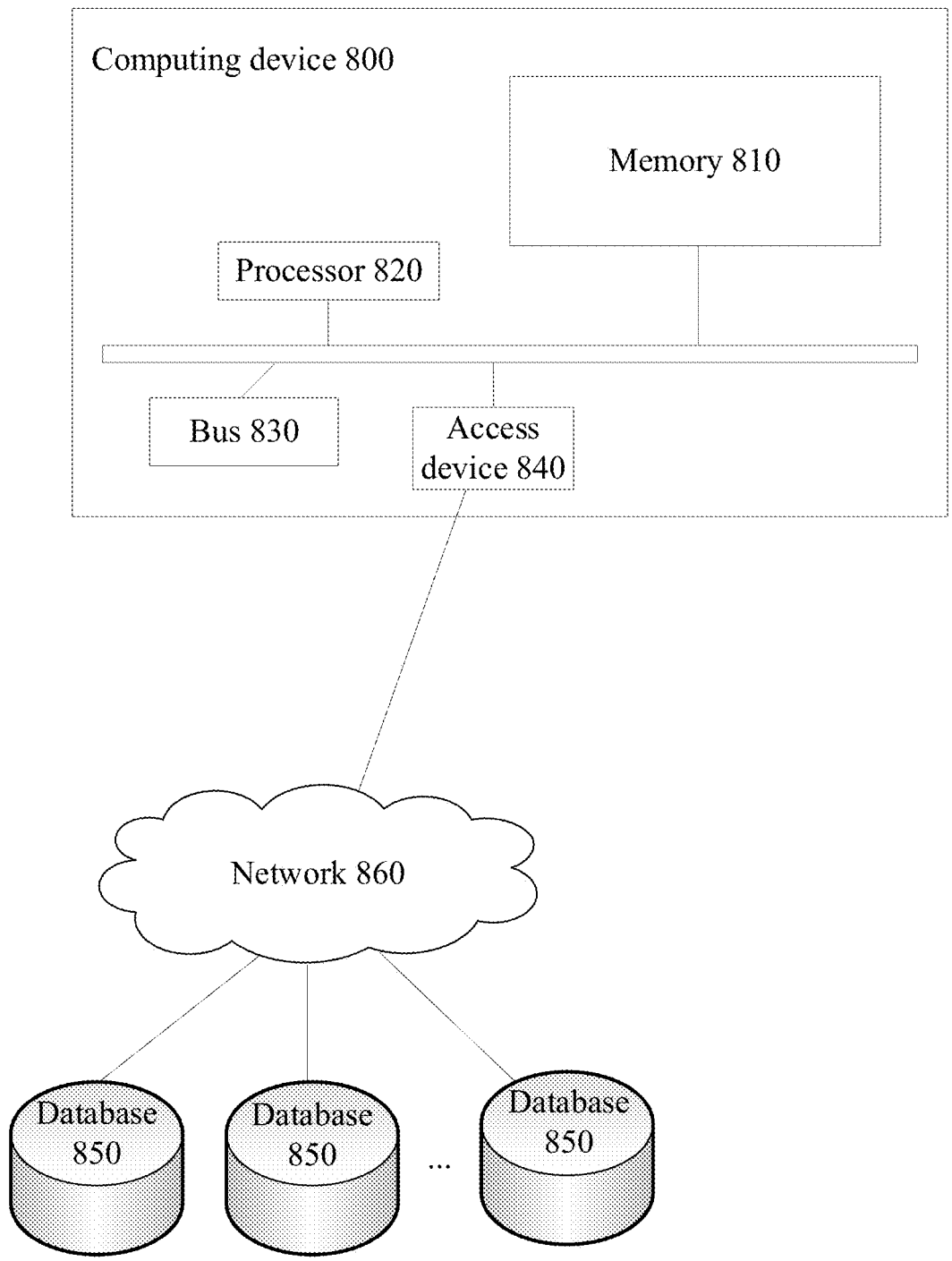
FIG. 8 is a block diagram of a structure of a computing device according to an embodiment of this application.

FIG. 8 is a block diagram of a structure of a computing device 800 according to an embodiment of this application. Components of the computing device 800 include but are not limited to a memory 810 and a processor 820. The processor 820 and the memory 810 are connected by using a bus 830, and a database 850 is configured to store data.

The computing device 800 further includes an access device 840, and the access device 840 enables the computing device 800 to communicate via one or more networks 860. Examples of these networks include a public switched telephone network (PSTN), a local area network (LAN), a wide area network (WAN), a personal area network (PAN), or a combination of communication networks such as the Internet. The access device 840 may include one or more of any type of network interface (for example, a network interface card (NIC)) that is wired or wireless, for example, an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In an embodiment of this application, the foregoing components of the computing device 800 and other components not shown in FIG. 8 may be alternatively connected to each other, for example, by using the bus. It should be understood that the block diagram of the structure of the computing device shown in FIG. 8 is merely used as an example instead of a limitation on the scope of this application. A person skilled in the art may add or replace other components as required.

The computing device 800 may be any type of still or mobile computing device, including: a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses); another type of mobile device; or a still computing device such as a desktop computer or a PC. The computing device 800 may be alternatively a mobile or still server.

The processor 820 is configured to execute the following computer executable instructions to:
 monitor a moving state of a first computing device, and if it is determined that the moving state of the first computing device meets a preset condition, control the first computing device to obtain a to-be-searched image including a target object;
 determine a first coordinate group of the target object in the to-be-searched image;
 obtain a target image of the target object from the to-be-searched image based on the first coordinate group; and
 determine and display, based on the target image, a search result related to the target object.

The foregoing describes the schematic solution of the computing device in this embodiment. It should be noted that the technical solution of the computing device and the technical solution of the foregoing image search method belong to a same concept. For details not described in detail in the technical solution of the computing device, refer to the descriptions of the technical solution of the foregoing image search method.

An embodiment of this application further provides a computer-readable storage medium. The computer-readable storage medium stores computer instructions, and the computer instructions are executed by a processor to:
monitor a moving state of a first computing device, and if it is determined that the moving state of the first computing device meets a preset condition, control the first computing device to obtain a to-be-searched image including a target object;
determine a first coordinate group of the target object in the to-be-searched image;
obtain a target image of the target object from the to-be-searched image based on the first coordinate group; and
determine and display, based on the target image, a search result related to the target object.

The foregoing is the schematic solution of the computer-readable storage medium in this embodiment. It should be noted that the technical solution of the storage medium and the technical solution of the foregoing image search method belong to a same concept. For details not described in detail in the technical solution of the storage medium, refer to the descriptions of the technical solution of the foregoing image search method.

An embodiment of this application provides a computer program product. When the computer program product is executed in a computer, the computer is enabled to perform the steps of the foregoing image search method.

The foregoing describes the schematic solution of the computer program product in this embodiment. It should be noted that the technical solution of the computer program product and the technical solution of the foregoing image search method belong to a same concept. For details not described in detail in the technical solution of the computer program product, refer to the descriptions of the technical solution of the foregoing image search method.

Specific embodiments of this application are described above. Other embodiments fall within the scope of the appended claims. In some cases, the actions or steps recorded in the claims can be performed in an order different from the order in embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in this specification are all example embodiments, and related actions and modules are not necessarily mandatory to this application.

In the foregoing embodiments, descriptions of the embodiments have respective focuses. For a part that is not described in detail in an embodiment, refer to related descriptions in another embodiment.

The example embodiments of this application disclosed above are merely intended to help describe this application. The optional embodiments do not describe all details, and the present invention is not limited to the specific implementations. Clearly, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. An image search method, comprising:
monitoring, by a processor, a moving state of a first computing device, wherein the monitoring the moving state of a first computing device comprises:
determining a moving distance of the first computing device in a period within a preset duration range based on locations of the first computing device, and
comparing the moving distance with a predetermined distance threshold to determine that the moving state of the first computing device meets a preset condition;
controlling, by the processor, the first computing device to obtain an image comprising a target object to be searched in response to the determining that the moving state of the first computing device meets the preset condition;
determining, by the processor, a first group of coordinates of the target object in the image, wherein the determining the first group of coordinates of the target object in the image comprises:
inputting the image into an object detection model to output a second group of coordinates of the target object in the image, and
converting the second group of coordinates into the first group of coordinates based on a preset ratio;
acquiring, by the processor, a target image of the target object from the image based on the determined first coordinate group; and
determining, by the processor based on the target image, a search result related to the target object and displaying the search result.

2. The image search method according to claim 1, further comprising:
periodically detecting the locations of the first computing device within the preset duration range; and
determining that the moving distance of the first computing device in each period is less than the predetermined distance threshold.

3. The image search method according to claim 2, wherein the monitoring a moving state of a first computing device further comprises:

in response to determining that a moving distance of the first computing device in a first period comprised in the preset duration range is greater than the predetermined distance threshold, re-performing the periodically detecting a location of the first computing device within a preset duration range.

4. The image search method according to claim 2, wherein the location of the first computing device comprises coordinate values in three directions; wherein the determining a moving distance of the first computing device in each period comprised in the preset duration range based on locations of the first computing device associated with each period, and comparing the moving distance with a predetermined distance threshold comprises:

determining, based on the coordinate values of the first computing device in the three directions in each period comprised in the preset duration range, moving distances of the first computing device in the three directions in each period, and comparing the moving distances of the first computing device in the three directions in each period with the predetermined distance threshold; and wherein determining that the moving state of the first computing device meets the preset condition comprises determining that the moving distances of the first computing device in the three directions in each period are all less than the predetermined distance threshold.

5. The image search method according to claim 4, wherein the monitoring a moving state of a first computing device further comprises:

in response to determining that a moving distance of the first computing device in a first direction in a first period comprised in the preset duration range is greater than the predetermined distance threshold, re-performing the periodically detecting a location of the first computing device within a preset duration range, wherein the first direction is any one of the three directions.

6. The image search method according to claim 1, wherein the moving state of the first computing device further comprises a moving speed; wherein the monitoring a moving state of a first computing device further comprises:

periodically detecting the locations of the first computing device within the preset duration range, determining a moving distance of the first computing device in each period comprised in the preset duration range based on locations of the first computing device associated with each period, determining a moving speed of the first computing device in each period based on a length of each period and the moving distance of the first computing device in each period, comparing the moving speed with a predetermined speed threshold, and determining that the moving speed of the first computing device in each period is less than the predetermined speed threshold.

7. The image search method according to claim 6, wherein the monitoring a moving state of a first computing device further comprises:

in response to determining that a moving speed of the first computing device in a first period comprised in the preset duration range is greater than the speed threshold, re-performing the periodically detecting a locations of the first computing device within a preset duration range.

8. The image search method according to claim 1, wherein before the determining a first group of coordinates of the target object in the image, the method further comprises: compressing the image based on a preset ratio to obtain a compressed image.

9. The image search method according to claim 1, wherein the acquiring a target image of the target object from the image based on the first group of coordinates comprises:

cutting an image, based on the first group of coordinates, from the image to obtain the target image of the target object.

10. The image search method according to claim 8, wherein before the acquiring a target image of the target object from the image based on the determined first group of coordinates, the method further comprises:

determining, based on the object detection model, a target probability of the target object in the image being an object comprised in a model library; and wherein the acquiring a target image of the target object from the image based on the determined first group of coordinates comprises: in response to determining that the target probability is greater than a probability threshold, acquiring the target image of the target object from the image based on the first group of coordinates.

11. The image search method according to claim 1, wherein the determining, based on the target image, a search result related to the target object comprises:

transmitting the target image to a second computing device for storage, and receiving an address of storing the target image sent back from the second computing device; and transmitting the address to a third computing device, and receiving the search result that is sent back from the third computing device based on the address and that is related to the target object.

12. The image search method according to claim 1, wherein the determining, based on the target image, a search result related to the target object comprises:

transmitting the target image to a third computing device, and receiving the search result that is sent back from the third computing device based on the target image and that is related to the target object.

13. The image search method according to claim 1, wherein after the determining, based on the target image, a search result related to the target object and displaying the search result, the method further comprises:

receiving an adjustment operation from a user of adjusting a location of a vertex in the first group of coordinates;

re-obtaining a target image of the target object in response to the adjustment operation; and determining, based on the re-obtained target image, the search result related to the target object for display.

14. A computing device, comprising:

a memory and a processor, wherein the memory is configured to store computer executable instructions, and the processor is configured to execute the computer executable instructions to implement operations comprising:

monitoring a moving state of a first computing device, wherein the monitoring a moving state of a first computing device comprises:

determining a moving distance of the first computing device in a period within a preset duration range based on locations of the first computing device, and comparing the moving distance with a predetermined distance threshold to determine that the moving state of the first computing device meets a preset condition;

controlling the first computing device to obtain an image comprising a target object to be searched in response to the determining that the moving state of the first computing device meets the preset condition;

determining a first group of coordinates of the target object in the image, wherein the determining the first group of coordinates of the target object in the image comprises:
inputting the image into an object detection model to output a second group of coordinates of the target object in the image, and
converting the second group of coordinates into the first group of coordinates based on a preset ratio;

acquiring a target image of the target object from the image based on the determined first group of coordinates; and determining, based on the target image, a search result related to the target object and displaying the search result.

15. A non-transitory computer-readable storage medium, wherein the computer-readable storage medium stores computer instructions, and the computer instructions are executed by a processor to implement operations comprising:

monitoring a moving state of a first computing device, wherein the monitoring a moving state of a first computing device comprises:
determining a moving distance of the first computing device in a period within a preset duration range based on locations of the first computing device, and
comparing the moving distance with a predetermined distance threshold to determine that the moving state of the first computing device meets a preset condition;

controlling the first computing device to obtain an image comprising a target object to be searched in response to the determining that the moving state of the first computing device meets the preset condition;

determining a first group of coordinates of the target object in the image, wherein the determining the first group of coordinates of the target object in the image comprises:
inputting the image into an object detection model to output a second group of coordinates of the target object in the image, and
converting the second group of coordinates into the first group of coordinates based on a preset ratio;

acquiring a target image of the target object from the image based on the determined first group of coordinates; and determining, based on the target image, a search result related to the target object and displaying the search result.

16. The computing device of claim 14, the operations further comprising:
periodically detecting the locations of the first computing device within the preset duration range; and
determining that the moving distance of the first computing device in each period is less than the predetermined distance threshold.

17. The computing device of claim 14, wherein the moving state of the first computing device further comprises a moving speed; wherein the monitoring a moving state of a first computing device further comprises:
periodically detecting the locations of the first computing device within the preset duration range,
determining a moving distance of the first computing device in each period comprised in the preset duration range based on locations of the first computing device associated with each period,
determining a moving speed of the first computing device in each period based on a length of each period and the moving distance of the first computing device in each period,
comparing the moving speed with a predetermined speed threshold, and
determining that the moving speed of the first computing device in each period is less than the predetermined speed threshold.

18. The non-transitory computer-readable storage medium of claim 15, the operations further comprising:
periodically the locations of the first computing device within the preset duration range; and
determining that the moving distance of the first computing device in each period is less than the predetermined distance threshold.

* * * * *